United States Patent [19]
Allen

[11] Patent Number: 5,590,215
[45] Date of Patent: Dec. 31, 1996

[54] METHOD FOR PROVIDING MEDICAL IMAGES

[76] Inventor: George S. Allen, 628 Westview Ave., Nashville, Tenn. 37205

[21] Appl. No.: 427,634

[22] Filed: Apr. 21, 1995

Related U.S. Application Data

[63] Continuation of Ser. No. 136,183, Oct. 15, 1993, abandoned.

[51] Int. Cl.$^6$ ..................................................... G06K 9/00
[52] U.S. Cl. ..................................... 382/128; 364/413.13
[58] Field of Search ..................................... 382/128, 131, 382/132, 190, 278; 364/413.13, 413.18, 413.19

[56] References Cited

U.S. PATENT DOCUMENTS

| | | | |
|---|---|---|---|
| 3,903,414 | 9/1975 | Herbstein et al. | 250/272 |
| 3,950,135 | 4/1976 | Whitesides et al. | 23/230 |
| 4,719,585 | 1/1988 | Cline et al. | 395/126 |
| 4,766,381 | 8/1988 | Conturo et al. | 324/309 |
| 4,821,213 | 4/1989 | Cline et al. | 395/124 |
| 4,835,712 | 5/1989 | Drebin et al. | 364/518 |
| 4,862,359 | 8/1989 | Trivedi et al. | 364/413 |
| 4,879,668 | 11/1989 | Cline et al. | 364/413.18 |
| 4,906,940 | 3/1990 | Greene et al. | 382/22 |
| 4,912,050 | 3/1990 | Fossel | 436/64 |
| 4,945,478 | 7/1990 | Merickel et al. | 364/413 |
| 4,947,323 | 8/1990 | Smith | 364/413 |
| 4,991,092 | 2/1991 | Greensite | 364/413 |
| 5,003,979 | 4/1991 | Merickel et al. | 364/413.13 |
| 5,040,225 | 8/1991 | Gouge | 382/6 |
| 5,099,846 | 3/1992 | Hardy | 128/653 |
| 5,185,809 | 2/1993 | Kennedy et al. | 382/6 |
| 5,187,658 | 2/1993 | Cline et al. | 364/413 |
| 5,200,345 | 4/1993 | Young | 436/63 |
| 5,224,175 | 6/1993 | Gouge et al. | 382/6 |
| 5,261,404 | 11/1993 | Mick et al. | 364/413.13 |

FOREIGN PATENT DOCUMENTS

| | | |
|---|---|---|
| 0526970 | 2/1993 | European Pat. Off. |
| 91/00059 | 7/1990 | WIPO |
| 91/00048 | 1/1991 | WIPO |

OTHER PUBLICATIONS

Proceedings of the SPIE, vol. 902, 14 Jan. 1988, USA, pp. 144–149, Engelstad et al.: *Information Extraction from Multi-modality Medical Imaging*.

6th Mediterranean Electrotechnical Conference, 22 May 1991, Slovenia, pp. 1233–1237, Bidaut: *Accurate Registration of Various Medical Imaging Madalities: An Applicatin to PET and MRI for Anatomical Localization and Kinetic Modelling*.

Proceedings of the 1993 Nineteenth Annual Northeast Bioengineering Conference, May 1993, USA, pp. 221–222, Chapnick et al.: *Techniques for Multimodality Image Registration*.

*Primary Examiner*—Yon J. Couso

[57] ABSTRACT

A technique for integrating voxelly-assigned information regarding a portion of anatomy derived from a number of sources into an accurate, single two dimensional pixel-based representation of a view of that anatomy is disclosed. Empirical relationships between known properties are used to infer values for unknown properties.

25 Claims, 2 Drawing Sheets

1

METHOD FOR PROVIDING MEDICAL IMAGES

This application is a continuation of application Ser. No. 08/136,183, filed Oct. 15, 1993 now abandoned.

BACKGROUND OF THE INVENTION

This invention is directed to the problem of providing images of anatomy that reflect at least one physical property of interest characteristic of the anatomy. It is also directed to the problem of inferring information regarding an unknown property of an interior region of anatomy from known properties of that and adjacent regions.

Clinicians have long sought ways of visualizing interior portions of the human body without having to expose those portions to light for direct visual inspection. The first technology which enabled the clinician to see an image of an interior portion of anatomy was the X-ray, which was utilized to form images of bone within months of the discovery of X-rays by Roentgen in 1895.

These images were essentially 2-dimensional views taken of a three dimensional volume of space. Of course, anatomy exists in three dimensional space and, in the 1970's, devices were developed that permitted the acquisition of information concerning the anatomy on a three dimensional basis (e.g., the work of Hounsfield in developing scanners that measured the density of an anatomical volume, which he displayed as slices).

Subsequent developments have further advanced the state of the art to where the clinician has at his disposal a variety of tools for obtaining information regarding each volumetric element within a volume of anatomy. In each of these techniques, the region of anatomy in question may be thought of as consisting of a very large number of small elemental units of volume called voxels. A voxel has length, width, and depth. The size of a voxel is generally limited by the inherent resolution of the scanner apparatus and technique utilized, as well as the underlying computational power with which the technique is practiced. Ideally, a voxel is small enough to depict an area of generally uniform attributes with respect to a property of interest.

A number of imaging techniques using a variety of types of imaging apparatus subdivide a volume of space into voxels. For example, in Magnetic Resonance Imaging (MRI), a "slice" of a patient's anatomy, or the like, having a finite thickness is excited with a predetermined pulsing signal. This pulsing signal causes protons (e.g., Hydrogen protons) in the slice to resonate giving off a signal, the intensity of which varies directly with proton density. Different properties can be the focus of the scan by varying the excitation energy, relaxation time parameters etc. employed in the scan, as well as by using any or none of a variety of chemical imaging agents. Whichever technique is employed, it results in the measurement of a property of the matter contained within each voxel. Such measurements are converted into electrical signals of varying intensity across the slice (which is as little as one voxel thick) and stored in a data base. Each measured intensity actually represents a value of the property of interest accessed by the scanner technique for a finite volumetric space in the patient's anatomy, i.e., voxel. A complete understanding of MRI is beyond the scope of this application. A more intensive discussion of MRI can be found in "The MRI Manual" by Robert B. Lufkin, published by Year Book Medical Publishers, 1990, the disclosure of which is hereby incorporated by reference in its entirety.

Another medical imaging technique is Computed Tomography. In CT, X-rays impinge upon a slice of a patient's anatomy, for example. Once this electromagnetic radiation has passed through the anatomy, its intensity is measure and stored. Generally, the X-ray source is rotated around the patient's anatomy, and measurements of electromagnetic intensity are taken for each different position of the X-ray source. The resulting data is processed in a computer to determine a intensity value for each voxel in the anatomical slice. This intensity value is proportional to the physical property CT scanners are constructed to sense—the proton density of matter located within the voxel. A complete understanding of CT is beyond the scope of this application. A more intensive discussion of CT imaging can be found in "Principles of Radiographic Imaging—An Art and a Science" by Richard R. Carlton and Arlene M. Adler, published by Delmar Publishing (1992), the disclosure of which is hereby incorporated by reference in its entirety.

While the concept of a voxel is useful in organizing and processing data, it is not the form in which information is presented to the clinician, no matter what the scanning technique employed. Because of limitations in display technology as well as the manner in which humans desire to view information, data is presented to clinicians in terms of two-dimensional renderings, either on a video screen or on a hard copy, such as a photograph. The elemental units into which a two dimensional image are presented are known as pixels.

In producing an MRI image, the measured signal intensities for each voxel are converted into a value related to a display device. For example, if the measured intensities are to be displayed on an 8-bit/pixel gray-scale monitor, each measured intensity for each voxel in the displayed slice would be converted into a value between 0 and 255 (i.e., 0 to $\{2^8-1\}$). Depending on the measured intensities, an image, which is the display of the constituent pixels, is generated, with one pixel being defined for each voxel in the slice. In the aggregate, these pixels visually portray the structure contained within the slice in terms of the properties detected by the imager in a manner which results in an image that can be interpreted by trained personnel.

Similarly, in formulating a CT image for display, the intensity values corresponding to a measured property—proton density—for each voxel in the slice must be scaled to a monochromatic grey scale for defining the pixels that actually form the image on the display device. In a CT image, one observes a higher level of definition of bone matter as compared to an MRI image. This is due to higher density of the bone matter which corresponds to a higher value in the grey scale for the CT image (i.e., pure white represents the highest value on the grey scale). Once again, these pixels visually portray the structure contained within the slice in terms of the properties detected by the imager in a manner which results in an image that can be interpreted by trained personnel.

Within the individual scanning techniques that have been developed, efforts have been made to enhance the information presented to the clinician. For example, a number of methods have been utilized for differentiating between different types of matter in a medical image. For instance, in U.S. Pat. No. 4,835,712 to Drebin et al., each voxel is classified as to percentages of different materials (i.e., air, fat, bone, and soft tissue). A color is assigned to each material (e.g., white for bone, green for fat, etc.) which is used to generate the appearance of each voxel.

In U.S. Pat. No. 5,185,809 to Kennedy et al. an apparatus is described for outlining different portions of the medical image depending on tissue type. Such outlining allows the user to discern between different matter types in the image.

In U.S. Pat. No. 4,991,092 to Greensite, an image processor is described for enhancing contrast between subregions of a region of interest. Biological tissue of different types are each assigned a different color depending on their NMR characteristics for better contrast.

U.S. Pat. No. 4,945,478 to Merickel et al. pertains to an imaging system for displaying an image of the aorta. MRI derived data (e.g., $T_1$ - weighted, $T_2$ - weighted) of the patient are used to discern different tissue types (esp. plaque constituent tissue) in the aorta. Once the tissue type is discerned, those pixels representing each tissue type are given a uniform color.

U.S. Pat. No. 5,187,658 to Cline et al. describes a system for segmenting internal structures contained within the interior region of a solid object.

U.S. Pat. No. 5,224,175 to Gouge et al. describes a method for analyzing ultrasound images. Values from the ultrasound image are compared to values for known tissues in order to identify tissue type.

U.S. Pat. No. 3,903,414 to Herbstein et al. simply describes a system that combines X-ray diffraction, fluorescence, and absorption.

The disclosure of the foregoing references are hereby incorporated by reference in their entirety. In general, the techniques taught therein calls for manipulating the data provided by a single type of scanner. The resulting image may be more pleasing to the eye or even have some additional functionality, but it still inevitably incorporates whichever uncertainties characterize the underlying scanning modality in question. Each individual scanning technique is limited to providing a visual representation of a physical property of the material that the imager measures. Unfortunately, that physical property may not correspond to what the clinician really wants to directly measure, or it may contain inherent levels of uncertainty that the clinician may wish to reduce. This problem is more clearly understood when considering the special case of the property that clinicians most clearly want to access: the visual appearance of tissue in light.

The clinician is most interested in viewing a hidden, interior region of anatomy without having to expose it by surgery, or, if he is to operate anyway, he wishes to see what surgery will reveal before the patient is cut open, so that he may better plan his surgical approach. In addition, he would like to see adjacent regions beyond what surgery will expose. Therefore, what is ideally required is a scan that shows the surgeon what his eyes would see, including the proper choice of color for each type of matter (i.e., tissue) viewed. In brain surgery, the number of visually distinct types of anatomy, i.e, differentiable by color and appearance, that the surgeon sees is small in number (although, were one to take the non-visible ways in which one could characterize tissue into account, such as by function or electrical activity, there would be potentially many more "types" of anatomy). There are perhaps ten or so such types of tissue that are visible and distinguishable to the unaided eye of the surgeon (e,g., bone, white matter, grey matter, venous tissue, etc.) and which are visibly characterized by a unique appearance and color (i.e., the appearance of each type of tissue is its "property"). Unfortunately, none of the existing scanning techniques can present an image that corresponds to what the clinician would actually see, because of the aforementioned limitations in each scanner type with regard to the information they can acquire. For example, a CAT scan simply does not do a very good job of detecting and differentiating among the various types of soft tissue present, but does do an excellent job of showing bone. Similarly, an MRI scan (which can be varied through the selection of various parameters and contrast agents) is better at differentiating among the various types of soft tissue present, but does not accurately scan bone. Other forms of scanning or imaging a portion of anatomy also are deficient in the range of physical properties that they can access. Because of the limitations inherent in the known types of scans and the tissue-specificity of their optimal uses, even colorization of pixels derived from these scans cannot show a true image of a section of anatomy, because the individual scans are simply unable to differentiate among all the various types of tissue that the clinician sees.

There remains a need for an imaging technique that can take advantage of the comparative advantages possessed by the various imaging techniques in imaging particular types of tissue so as to form a composite image based on the information most accurately perceived by each of the imaging techniques.

There remains a need for an imaging technique that can more accurately form inferences regarding a property not readily accessible from any one scanning technique (such as visible appearance) by utilizing information provided by several scanning techniques concerning properties that are more readily accessible.

SUMMARY OF THE INVENTION

This invention presents a new manner of integrating voxelly-assigned information derived from a number of sources into an accurate representation of the region of interest. The method creates a data set that can be used to generate visual depictions of. the region of interest. Typically, the clinician will prefer that this visual representation depict what he would see were he to directly look at the corresponding two dimensional surface of anatomy with his eyes in ordinary light. This representation may take the form of a two dimensional pixel-based display, or a three dimensional view (as via a holographic display). More broadly, the method enables one to draw inferences regarding a property of a hidden region of matter that is not directly accessible by utilizing information concerning other properties that are more readily accessible.

Considering the voxel as a volume of anatomy, one can attribute a number of properties to each voxels. These properties include, and of course are not limited to, density (as via a CT scan), sound transmission characteristics, electrical activity, temperature, true appearance under visible light, energy usage, manner of incorporating a radioactive isotope (via PET), various MRI-based parameters (such as t1 and t2 among others), as well as any other parameter detectable by a scanner or other device that provides location specific information. Some of the aforementioned properties (such as density) are directly ascertainable for at least some types of tissue using known scanning techniques (e.g., CT). But others, such as the true visual appearance for each of the approximately ten types of tissue of interest to a neurosurgeon, may not be directly accessible with any one scan, or may require several scans to ascertain.

According to one aspect of this invention, one first empirically determines the relationship between each one of the ten or so visually distinct types of matter and each of the directly accessible scannable properties by applying standard statistical methods to the image data collected in a controlled, well defined series of observations. This information can then be used to determine which combination of measures of properties, chiefly derived from various scan modalities, sufficiently define with the requisite degree of specificity each of the ten known types of tissue by appearance (the properties in question here).

More broadly, information concerning known, measurable properties can be used to form an inference regarding the value of another, perhaps inaccessible, physical property of a voxel. The true-color appearance of a section of anatomy is but one example of a property that is not directly accessible to the clinician surgically exposing the area in question. This information is then stored in a series of look-up tables contained within a computers memory.

Once the necessary correlations between scannable properties and the true visual image (i.e., property) of a tissue type (or other discernable surface or volumetric element of a region of interest) is obtained, it becomes possible to generate pixels to provide two dimensional views of a portion of anatomy that can be color coded to provide true color fidelity of the area in question. The clinician would get an image showing just what he would see upon surgically exposing the area in question to his eyes and to the light.

This is done as follows. The clinician determines which area of the anatomy (e.g., the brain) he wishes to obtain a color-true view of. If it is the brain, he and the computer know that there are only ten or so types of visually distinctive types of matter present. The computer then searches its memory, and tells the clinician which types of scans are necessary in order to provide the data necessary to provide the color-true image. The scans required must provide registration of image space to physical space within each scan, as well as of image space onto image space across scans. One way of accomplishing this is through the use of image markers, the use of which is described in U.S. Pat. No. 4,991,579 (the contents of which are incorporated herein by reference); another, less preferred method is through the use of a stereotactic frame. If the necessary scans have already been taken, then the information generated by these scans are loaded into memory. The computer, armed with the empirically derived relationships previously established between the various parameters the clinician can remotely access via the scans and the various tissue types by their more visual appearance, selectively culls the addresses of those voxels in the plane in question corresponding to each of the ten tissue types by appearance, one after the other. (Of course, if a lesser degree of color fidelity is desired by the clinician, fewer tissue types may be needed or fewer scans may be required.) By considering the voxels in planes, The address of each voxel of interest can define a pixel address on the forming image. For example, the addresses of voxels lying along a plane can be used to define a group of pixels that will form a plane image. Then, the computer assigns a color to each pixel on the basis of the tissue type, as a second table within the computer defines the true color corresponding to each of the specific tissue types that have been assigned to each voxel. Once this has been done, the computer generates an image on a screen or on paper in which each pixel is defined within the computer to depict one of the ten known tissue types, and which has been assigned a color for display that matches the actual color of the known corresponding tissue type.

The invention is not limited to providing views that correspond to what a surgeon sees, but could be extended to providing graphical representations of any anatomical or physiological feature by relying on empirically established relationships between the feature or property one wishes to depict and the data that one can obtain via various imaging techniques.

DETAILED DESCRIPTION

Figure 1:
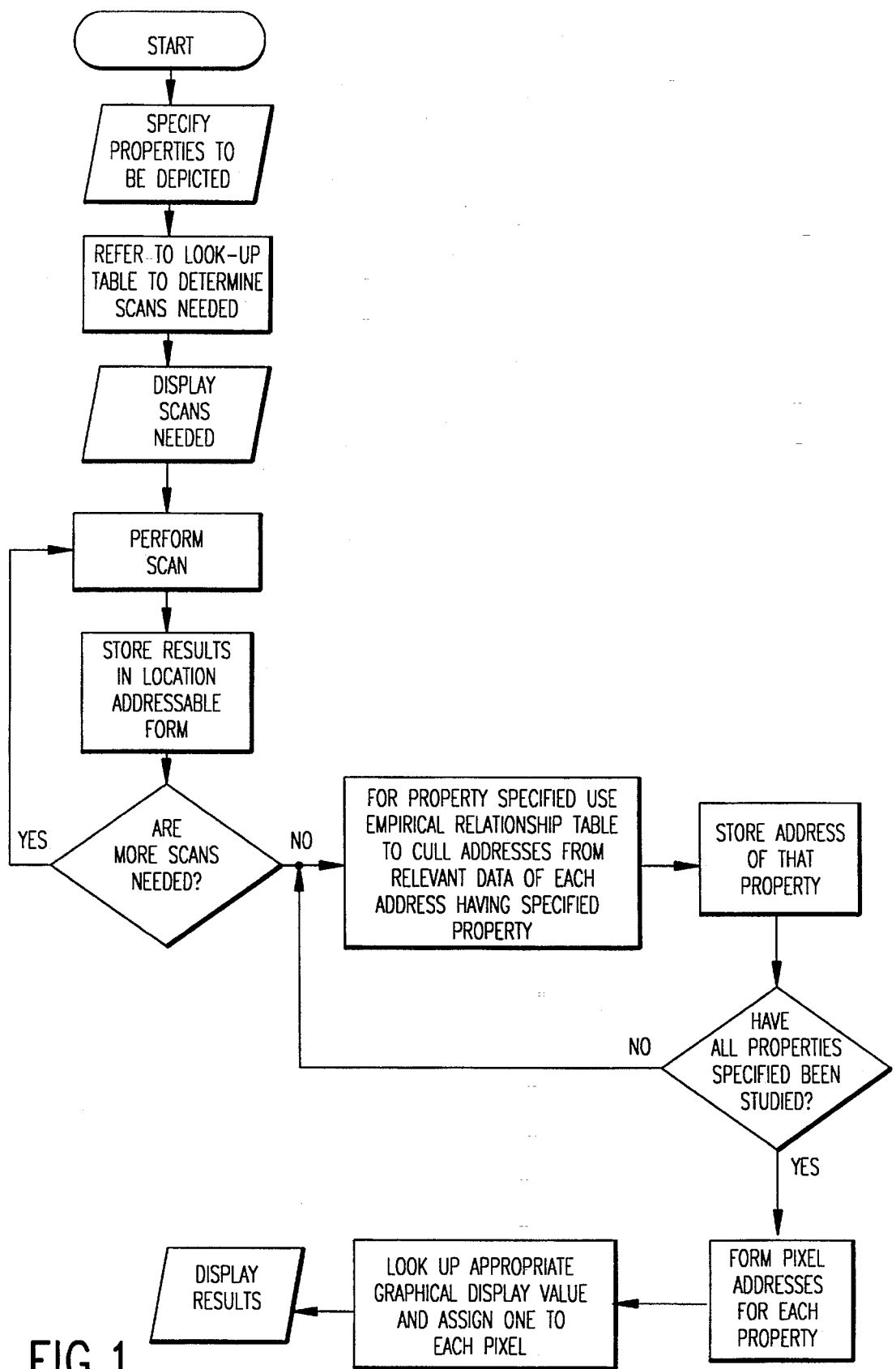
FIG. 1 is a flow chart of the method of the present invention.
Figure 2:
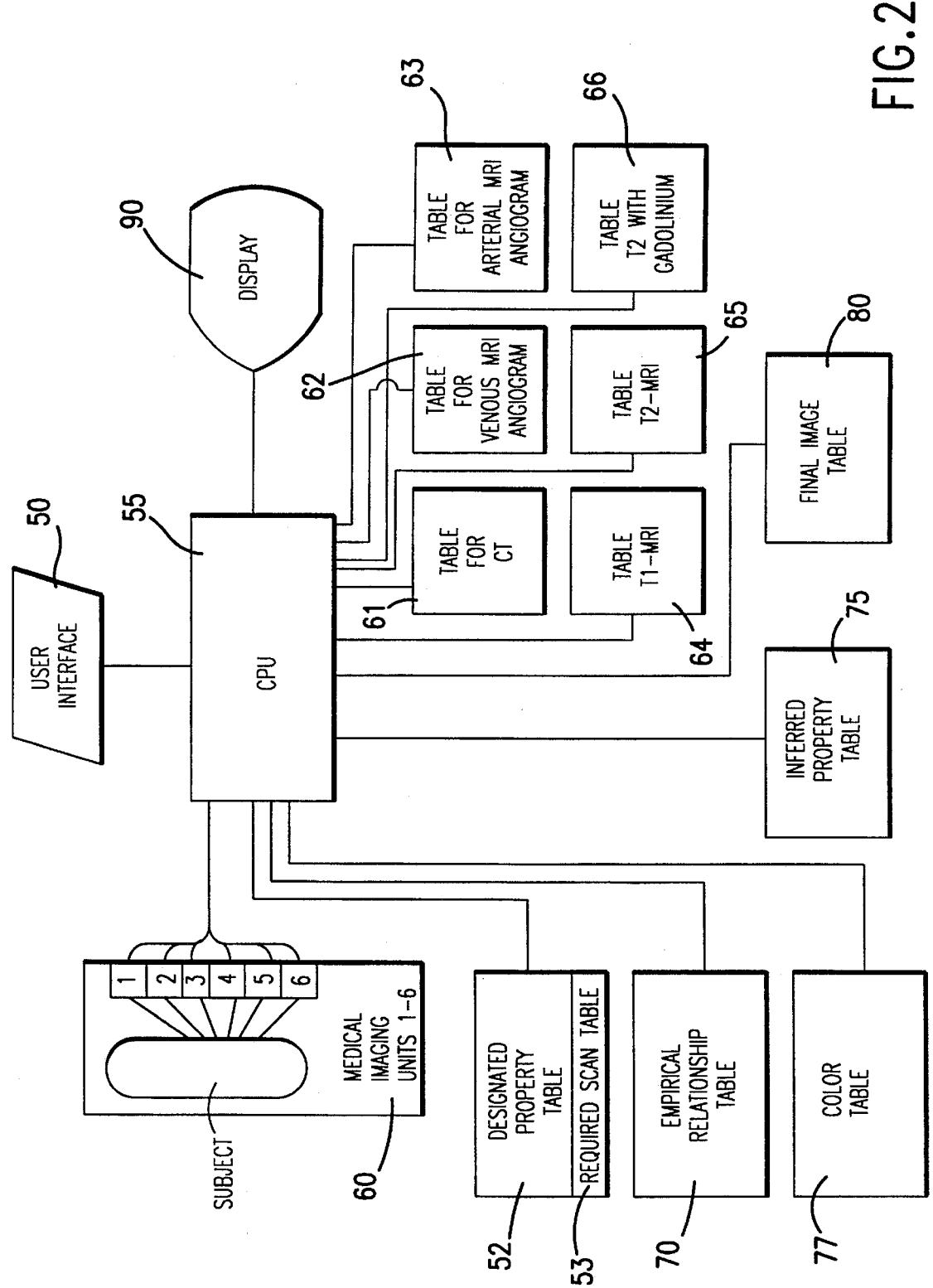
FIG. 2 is a block diagram of a system for implementing the method of the present invention.

The method of the invention shall be further explained by reference to the task of providing a true color image of the human head.

The clinician first determines which areas of the head he wishes to image, and which particular types of tissue present he wishes to see. Typically, the physician would be interested in obtaining an image that showed only those portions of the head of the greatest interest for a particular diagnosis. In this example, to evaluate the brain for certain symptoms, the physician may decide that he requires a view of the following tissues for forming a diagnosis: skull, veins, arteries, brain tissue including grey matter and white matter, a tumor, ventricles and optic nerves. This information is entered via a user interface 50 to a computer 55, where it is stored in a table 52 called the Designated Property Table. This table contains a sub-table 53 that correlates the type or types of scans which should be performed to best provide information for forming an image of each type of tissue the clinician has designated. A list of these scans, along with scan-specific parameters required (e.g., the use of Gadolinium for an MRI scan) is then displayed to the clinician via the interface 50. The patient is then subjected to the computer specified scans.

The computer then determines the particular scans that are most appropriate for characterizing each designated type of tissue. This is determined chiefly through prior empirical study. With respect to the example presented above, it is known that bone or skull can best be seen with a CT scan un-enhanced; the veins and arteries can be seen best with a Venous MRI Angiogram and Arterial MRI Angiogram, respectively; the white matter of the brain can be seen more clearly with a T-1 MRI Scan; the grey matter can be seen best with a T-2 MRI Scan; if there is interest in the optic nerves, these can be seen with a T-1 MRI Scan. If there is interest in locating a specific tumor, such as a meningioma, this can best be seen with a T-2 MRI scan with Gadolinium; and for ventricles, this can best be seen again with a T-1 MRI Scan. Furthermore, it can be empirically determined with respect to each physical property measured by the aforementioned scan which range of values of that property correlate with any particular feature. For example, a correlation can be drawn between the magnitude of the Hounsfield numbers generated in a CT scan with the probability that the voxel associated with that particular Hounsfield number contains bone. Similarly, statistical correlations can be empirically determined with respect to any other property and a measured value by empirical study. These relationships are stored in the Empirical Relationship Table 70.

In each scan, the patient is provided with a means for establishing a fixed address for each volumetric element within the patient's head that is of interest. Preferably, this means may be a series of at least three fiducial markers, as described in U.S. Pat. No. 4,991,579 to Allen. Less preferable means of establishing a fixed address include the use of a stereotactic frame, or contour data relating the interior of the skull to relatively immutable features of the skull. It is necessary that some means be provided to relate the data provided by one scan for a particular element within the head to data provided by other scans to that same element within the head. This is particularly important where the patient must be physically moved from scanner to scanner, or when it is desired to image the patient in a single scanner at temporally spaced times. The degree to which statistical correlations can be used to infer information is dependent upon the accuracy with which these data sets can be mapped onto one another, and fiducial markers are the preferred means of providing such mapping accuracy.

With each scan, a property related to each voxel of interest is measured and can be expressed in terms of a voltage. The values of each voxel measurement are then stored in a data structure (such as an array) within the computer or, more typically, on a mass-storage device. This first array will then contain a series of addresses corresponding to each voxel; the voxels can be related to the patient's physical space by, for example, the use of fiducial markers as noted above. Associated with each address is a number denominative of the magnitude of a particular property which the scanner measures. In the example given, the values generated by the CT scan would be stored in the table or array 61.

The process is repeated for each type of scan designated by the computer. Each scan produces its own data array or table having the same addresses as the other scans, but containing numbers reflective of the magnitude of the property that the scanner measures. In the example given, table 62 contains data generated by the venous MRI angiogram, table 63 contains data generated by the Arterial MRI angiogram, table 64 contains data generated by the T1 MRI, table 65 contains data from the T2 MRI, and table 66 contains data generated by the T2 scan with Gadolinium. There can be as many tables as there are sources of information.

When the scans have been entered into memory, the computer then returns to the Designated Property Table 52 and proceeds to extract the pre-selected property that the clinician wishes to see. For that property (i.e., the tissue specified), the computer looks up in an Empirical Relationship table 70 the range of values of properties obtained through the scans that correlate to the presence of that type of tissue within a desired degree of accuracy. In the particular example given, the designation of a voxel as belonging to a specific tissue type may require nothing more than examination of the value obtained from a single scan (e.g., bone can be determined from consideration of the Hounsfield numbers of a CT scan alone). However, more generally, the Empirical Relationship Table 70 may correlate values obtained from a variety of scans in determining the identity of those voxels that correspond to the particular type of tissue under consideration. Once the identity of the property associated with a voxel is established, that information is stored in an Inferred Property Table 75.

As the addresses of voxels having the first designated property are determined, a corresponding pixel table 80 is created. In this table, an address corresponding to the voxel in question is given an appearance value to specify the display characteristic which the pixel will have in forming any image of the area. The color scheme is stored in color table 77. Typically, in the interest of having the depicted region appear true to life, the bone would be assigned the color white; veins the color blue; arteries the color red; white matter of the brain tissue would be assigned the color cream; the grey matter of the brain tissue the color reddish-tan; the optic nerves yellow; the meningioma as reddish-grey; and the ventricles as pale aqua. Of course, other color scheme could be designated, whether to better highlight other aspects of the anatomy or for other reasons.

This process would be repeated for every property in the Designated Property Table. The result would be a set of addresses corresponding to physical locations of the brain of interest to the physician, with which is associated information identifying each location by tissue type and its corresponding color. This information, collected in the form of pixels, is then used to create a picture via display 90 of the region of interest in its true colors.

In the above example, the goal of the clinician was to obtain a true-color image of a portion of cranial anatomy. This generally required the identification of a small number of types of tissue. However, the invention may be viewed in broader terms. The information obtained by a scan is by definition accessible. It is measured as a magnitude of a property that is generally not the property of actual interest to the clinician. (For example, the clinician may be interested in the distribution of bone or white matter within the head, but he is certainly much less likely to be interested in the distribution of protons or certain spin relaxation times within the head.) The "Accessible Property" then, is merely at best a surrogate of another property of greater interest, such as appearance, tissue type, etc. This latter property may be generally thought of as a Derived Property that the clinician specifies as the Designated Property.

The addresses of those portions of matter having a particular Derived Property may be discernable by reference to only a single scan. This is true where the empirical correlation between the Derived Property to the Accessible Property is strong within a given range of scanned values. For example, when hounsfield numbers within a given range are encountered, the computer may immediately label the corresponding voxels as being bone without reference to other information.

But for other properties, particularly with respect to the soft tissues of the body, this one-to one correlation may not be present. At this point, the power inherent in the method's collection of information from multiple sources with respect to voxels having commonly defined addresses within each imaging modality comes to the fore. The technique provides a rapid method for storing information derived from multiple sources regarding matter in well defined locations. The power of the computer can be used to rapidly study the manner in which the information obtained about a voxel with respect to one type of scan is related to the values obtained for that voxel for other scanned properties, since the data is handily stored in computer addressable form. Numerous standard statistical studies can be employed to study these relationships. These known properties can thus be related to each other, as well as to their location in space or the values of identical or different properties in other parts of the region of interest. These can further be correlated with properties that are either difficult or impossible to measure non-invasively. Invasive studies carried out in the course of other medically necessary procedure, cadaver studies, animal studies or any other known manner of gathering information regarding a region of matter could be used to aid in the manner in which the various measured properties correlate to an other, unscanned, property of interest.

In fact, the technique can be used to enable the mathematically rigorous study of such relationships among the scanner accessible properties. In essence, the technique described here permits one to infer an unknown property, which may or may not be accessible noninvasively, by weighing the data provided by other known properties. This might well lead one to establish a degree of overlap among the imaging modalities employed that would enable clinicians to obtain all of the information they require by using fewer types of scan, which would reduce the expense involved.

What is claimed is:

1. A method for determining a measurement of a physical property of interest associated with the discrete spatial locations of a three dimensional object, wherein each spatial location of the three dimensional object has a unique address, and wherein the three dimensional object is composed of a plurality of types of matter, each type of matter having at least two properties, comprising the steps of:

generating a first set of data reflective of at least a first physical property accessible by a first imaging technique and scanner for each spatial location of the area of interest;

generating a second set of data reflective of at least a second physical property accessible by a second, different imaging technique and scanner for each spatial location of the area of interest;

storing the data generated by the first and second imaging techniques in a memory storage device along with the address of each spatial location; and assigning to each unique address a first value, said first value representing the measurement of said property of interest for each unique address, said first value based on a correlation between said property of interest with the measure of the first physical property obtained in the first imaging scan taken and the correlation between said property of interest with the measure of the second physical property obtained in the second imaging scan taken, such that said property of interest is different from said first and second physical properties.

2. The method of claim 1, further comprising the step of assigning to each address a pixel display value defining the physical appearance that the pixel is to have upon its display.

3. The method of claim 2, further comprising the step of displaying an image based on the pixels so defined.

4. The method of claim 1, wherein the first set of data is generated by a CT scan.

5. The method of claim 1, wherein the first set of data is generated by a PET scan.

6. The method of claim 1, wherein the first set of data is generated by a particular type of MRI scan.

7. The method of claim 1, further comprising the steps of generating additional sets of data reflective of at least one additional physical property accessible by additional imaging techniques for each spatial location of the area of interest, wherein each spatial location has an address; and storing the additional sets of data so generated in a computer memory along with the address of each spatial location.

8. The method of claim 1, wherein the three dimensional object includes a portion of human anatomy.

9. The method of claim 1, wherein the physical properties being determined relate to the appearance of the region when exposed to visible light.

10. The method of claim 1, wherein the second set of data is generated by a CT scan.

11. The method of claim 1, wherein the second set of data is generated by a PET scan.

12. The method of claim 1, wherein the second set of data is generated by a particular type of MRI scan.

13. The method of claim 1, wherein the correlation between the property of interest and a value of at least one of the physical properties measured in at least one of the generated data sets is determined empirically.

14. The method of claim 1, wherein at least one of the generated sets of data is reflective of density.

15. The method of claim 1, wherein at least one of the generated sets of data is reflective of the position of known features in relation to each other.

16. The method of claim 1, wherein at last one of the generated sets of data is reflective of the presence of hydrogen.

17. The method of claim 1, wherein at last one of the generated sets of data is reflective of sound transmissibility.

18. The method of claim 1, wherein at least one of the generated sets of data is indicative of the manner in which light is absorbed or reflected.

19. The method of claim 1, wherein at last one of the generated sets of data is reflective of temperature.

20. The method of claim 1, wherein at least one of the generated sets of data is reflective of electrical activity.

21. The method of claim 1, wherein at least one of the generated sets of data is reflective of energy usage.

22. A method for determining a measurement of a tissue type property associated with the discrete spatial locations of a three dimensional object, wherein each spatial location of the three dimensional object has a unique address, and wherein the three dimensional object is composed of a plurality of types of matter, each type of matter having at least two properties, comprising the steps of:

generating a first set of data reflective of at least a first physical property accessible by a first imaging technique and scanner for each spatial location of the area of interest;

generating a second set of data reflective of at least a second physical property accessible by a second, different imaging technique and scanner for each spatial location of the area of interest;

storing the data generated by the first and second imaging techniques in a memory storage device along with the address of each spatial location; and assigning to each unique address a first value, said first value representing the measurement of the tissue type property for each unique address, said first value based on a correlation between the tissue type property with the measure of the first physical property obtained in the first imaging scan taken and the correlation between the tissue type property with the measure of the second physical property obtained in the second imaging scan taken, such that said first and second physical properties are different from the tissue type property.

23. The method of claim 22, further comprising the step of assigning to each unique address a pixel display value defining the physical appearance that the pixel is to have upon its display.

24. The method of claim 23, further comprising the step of displaying an image based on the pixels so defined.

25. The method of claim 22, wherein the three dimensional object includes a portion of human anatomy.

* * * * *